United States Patent
Wilson et al.

(10) Patent No.: US 8,974,620 B2
(45) Date of Patent: Mar. 10, 2015

(54) TOUCH SCREEN SHIELD

(71) Applicant: Racing Optics, Inc., Las Vegas, NV (US)

(72) Inventors: Stephen S. Wilson, Las Vegas, NV (US); Bart Wilson, Las Vegas, NV (US); Seth Wilson, Las Vegas, NV (US)

(73) Assignee: Racing Optics, Inc., Las Vegas, NV (US)

( * ) Notice: Subject to any disclaimer, the term of this patent is extended or adjusted under 35 U.S.C. 154(b) by 0 days.

(21) Appl. No.: 13/838,311

(22) Filed: Mar. 15, 2013

(65) Prior Publication Data
US 2013/0209752 A1 Aug. 15, 2013

Related U.S. Application Data

(62) Division of application No. 12/780,443, filed on May 14, 2010.

(51) Int. Cl.
| | | |
|---|---|---|
| *B29C 65/50* | (2006.01) |
| *B32B 37/26* | (2006.01) |
| *G06F 3/041* | (2006.01) |
| *G06F 1/16* | (2006.01) |

(52) U.S. Cl.
CPC ...... *G06F 3/041* (2013.01); *G06F 2203/04103* (2013.01); *G06F 2203/04107* (2013.01); *G06F 1/1633* (2013.01); *Y10T 156/1052* (2013.01)
USPC ............................. 156/247; 156/249; 156/289

(58) Field of Classification Search
USPC ......... 428/40.1, 41.8, 343; 349/122; 345/173; 156/247, 289, 290, 249
See application file for complete search history.

(56) References Cited

U.S. PATENT DOCUMENTS

| | | | |
|---|---|---|---|
| 3,948,662 A | 4/1976 | Alston et al. | |
| 3,950,580 A | 4/1976 | Boudet | |
| 3,987,569 A * | 10/1976 | Chase | ............................ 40/773 |
| 4,204,231 A | 5/1980 | Permenter | |
| 4,696,860 A | 9/1987 | Epperson | |
| 4,889,754 A | 12/1989 | Vargas | |

(Continued)

FOREIGN PATENT DOCUMENTS

| | | |
|---|---|---|
| DE | 19808535 | 9/1999 |
| EP | 1471415 | 10/2004 |

(Continued)

OTHER PUBLICATIONS www.store.moshimode.com, "iVisor AG for iPad 2 black", 2004-2010.*

(Continued)

*Primary Examiner* — Sing P Chan
(74) *Attorney, Agent, or Firm* — Stetina Brunda Garred & Brucker

(57) ABSTRACT

A shield that is attachable to a touch sensitive screen is disclosed. The shield may be attached to the touch sensitive screen only at its outer peripheral portion. An air gap is enclosed between the shield and the touch sensitive screen to form a planar air bearing. The shield preferably does not touch the active area of the touch sensitive screen when the user is not touching the shield but only viewing the touch sensitive screen through the shield. This mitigates unwanted optical artifacts such as trapped air bubbles, Newton rings and chromatic interference while maintaining the sensitivity of the touch sensitive screen.

14 Claims, 5 Drawing Sheets

(56) References Cited

U.S. PATENT DOCUMENTS

| | | | |
|---|---|---|---|
| 4,907,090 | A | 3/1990 | Ananian |
| 5,486,883 | A | 1/1996 | Candido |
| RE35,318 | E | 8/1996 | Warman |
| 5,668,612 | A | 9/1997 | Hung |
| 5,896,991 | A | 4/1999 | Hippely et al. |
| 6,250,765 | B1 | 6/2001 | Murakami |
| 6,305,073 | B1 | 10/2001 | Badders, Jr. |
| 6,469,752 | B1 | 10/2002 | Ishikawa et al. |
| 6,536,589 | B2 | 3/2003 | Chang |
| 6,555,235 | B1 | 4/2003 | Audeferheide et al. |
| 6,559,902 | B1 | 5/2003 | Kusuda et al. |
| 6,592,950 | B1 | 7/2003 | Toshima et al. |
| 6,660,389 | B2 | 12/2003 | Liu et al. |
| 6,667,738 | B2 * | 12/2003 | Murphy .................. 345/173 |
| 6,750,922 | B1 | 6/2004 | Benning |
| 6,777,055 | B2 | 8/2004 | Janssen et al. |
| 6,800,378 | B2 | 10/2004 | Hawa et al. |
| 6,841,190 | B2 | 1/2005 | Liu et al. |
| 6,864,882 | B2 | 3/2005 | Newton |
| 6,879,319 | B2 | 4/2005 | Cok |
| 6,995,976 | B2 | 2/2006 | Richardson |
| 7,070,837 | B2 | 7/2006 | Ross |
| 7,226,176 | B1 | 6/2007 | Huang |
| 7,351,470 | B2 | 4/2008 | Drahelm et al. |
| 7,495,895 | B2 | 2/2009 | Carnevali |
| 7,629,052 | B2 | 12/2009 | Brumwell |
| 8,044,942 | B1 | 10/2011 | Leonhard et al. |
| 2002/0101411 | A1 | 8/2002 | Chang |
| 2002/0122925 | A1 | 9/2002 | Liu et al. |
| 2002/0195910 | A1 | 12/2002 | Hus et al. |
| 2003/0012936 | A1 | 1/2003 | Draheim et al. |
| 2003/0087054 | A1 | 5/2003 | Janssen et al. |
| 2003/0110613 | A1 | 6/2003 | Ross |
| 2004/0004605 | A1 | 1/2004 | David |
| 2004/0109096 | A1 | 6/2004 | Anderson et al. |
| 2004/0121105 | A1 | 6/2004 | Janssen et al. |
| 2004/0227722 | A1 | 11/2004 | Friberg et al. |
| 2006/0114245 | A1 | 6/2006 | Masters et al. |
| 2007/0181456 | A1 | 8/2007 | Kusuda et al. |
| 2007/0211002 | A1 | 9/2007 | Zehner et al. |
| 2007/0212508 | A1 * | 9/2007 | Mase .......................... 428/40.1 |
| 2007/0229962 | A1 | 10/2007 | Mason, Jr. |
| 2008/0030631 | A1 | 2/2008 | Gallagher |
| 2008/0055258 | A1 | 3/2008 | Sauers |
| 2009/0054115 | A1 | 2/2009 | Horrdin et al. |
| 2009/0086415 | A1 | 4/2009 | Chipping |
| 2009/0087655 | A1 | 4/2009 | Yamada et al. |
| 2010/0026646 | A1 | 2/2010 | Xiao et al. |
| 2010/0102197 | A1 | 4/2010 | McIntyre |
| 2010/0238119 | A1 | 9/2010 | Dubrovsky et al. |
| 2010/0245273 | A1 | 9/2010 | Hwang et al. |
| 2010/0270189 | A1 | 10/2010 | Pedersen, II et al. |
| 2011/0279383 | A1 | 11/2011 | Wilson et al. |
| 2012/0003431 | A1 | 1/2012 | Huang |
| 2012/0183712 | A1 | 7/2012 | Leonhard et al. |
| 2012/0188743 | A1 | 7/2012 | Wilson et al. |

FOREIGN PATENT DOCUMENTS

| | | |
|---|---|---|
| JP | 4314537 | 11/1992 |
| JP | 2002328613 | 11/2002 |
| TW | 200700793 | 1/2007 |
| TW | 201027992 | 7/2010 |
| WO | WO03052678 | 6/2003 |

OTHER PUBLICATIONS

Jake Gaecke, "Appletell Reviews the iVisor for IPad", appletell.com, Sep. 15, 2010 at 12:32pm, www.technologytell.com/apple/60407/appletell-reviews-ivisor-ag-for-ipad/, 2pgs.

www.nushield.com/technology.php, "What Makes NuShield Screen Protectors Superior", 2pgs.

www.spigen.com, "Something You Want", 2pgs.

www.zagg.com, "Apple iPad 2 (Wi-Fi 3G) Screen Protector", 2pgs.

www.gadgetguard.com, "Invisible Gadget Guard, the Original", 1pg.

www.incipotech.com, "Protect your iPhone 4 with Screen Protectors from Incipio", 3pgs.

www.store.moshimonde.com, "iVisor AG iPad Screen Protector", Jul. 2010, 7pgs.

www.store.moshimonde.com, "iVisor XT Crystal Clear Protector for iPad", Aug. 2010, 3pgs.

www.store.moshimonde.com, "iVisor AG for iPad 2 Black", Mar. 2011, 5pgs.

www.store.moshimonde.com, "iVisor AG for iPad 2 White", Mar. 2011, 3pgs.

www.store.moshimonde.com, "iVisor AG for iPhone 4/4S Black", Nov. 2010, 5pgs.

www.store.moshimonde.com, "iVisor AG for iPhone 4/4S White", May 2010, 4pgs.

English translation of TW201027992,"Monitor Protection Device for a Flat Panel Display", 1 pg.

Defendant's Motion For Summary of Judgment, Oct. 25, 2013, pp. 1-31.

Prosecution History of U.S. Appl. No. 95/002,073 titled Touch Screen Protector pp. 1-1,980.

* cited by examiner

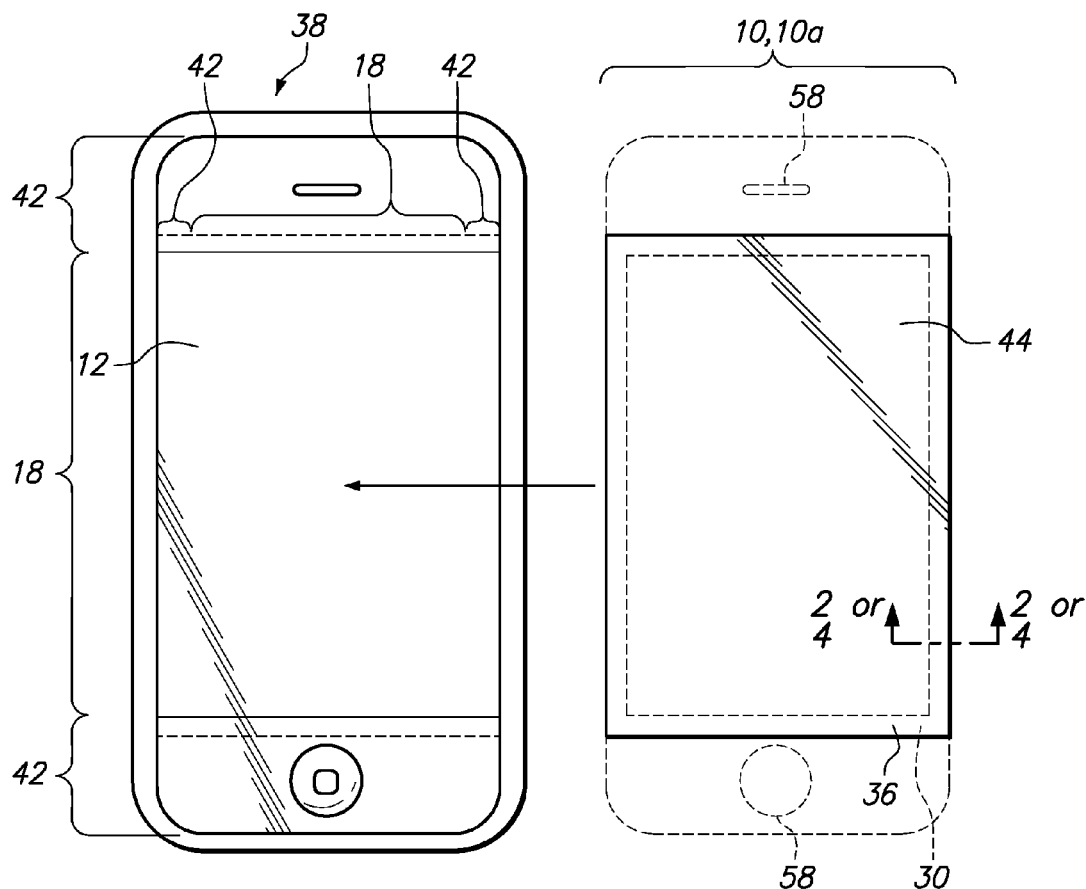
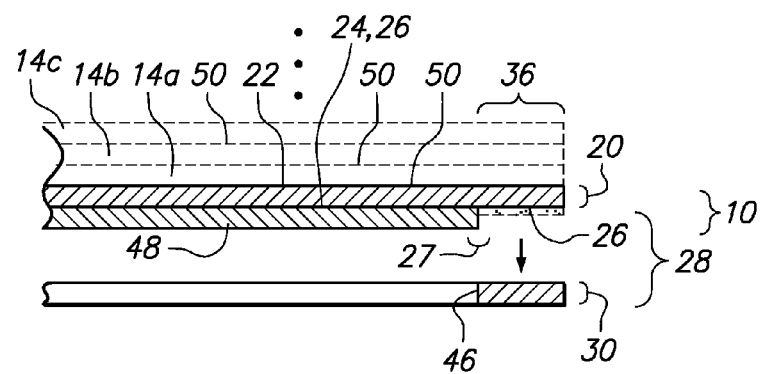

TOUCH SCREEN SHIELD

CROSS-REFERENCE TO RELATED APPLICATIONS

This application is a divisional patent application of U.S. patent application Ser. No. 12/780,443, filed on May. 14, 2010, the entire contents of which is expressly incorporated herein by reference.

STATEMENT RE: FEDERALLY SPONSORED RESEARCH/DEVELOPMENT

Not Applicable

BACKGROUND

The present invention relates to transparent films applied to touch sensitive screens for impact and/or scratch protection.

Electronic devices such as the IPHONE (i.e., smartphone) have a touch sensitive screen by which the user may operate the electronic device. The touch sensitive screen displays electronic buttons and search boxes that the user can select by touch. These touch sensitive screens are very large and subject to cracking and scratching during normal use by the user as well as when the electronic device is dropped. The resulting damage may be costly to repair and may require replacement of the entire electronic device or phone. Accordingly, there is a need for a low cost device that will cushion and absorb an impact that could break or scratch the glass face of the electronic device and yet not interfere with the functionality and sensitivity of the touch screen or the quality of the image displayed on the screen.

Prior art films do exist that are adhered to the touch sensitive screen. Unfortunately, these protective films leave unsightly air bubbles between the transparent protective film and the transparent glass of the electronic device. Moreover, these films provide no impact absorption protection to the glass face.

Based on the foregoing, there is a need in the art for an improved protective film for touch sensitive screens.

BRIEF SUMMARY

The touch screen shield disclosed herein addresses the needs discussed above, discussed below and those that are known in the art.

The touch screen shield disclosed herein may comprise a base transparent layer that is attached to a touch sensitive screen of an electronic device. A planar air bearing may be formed between the base transparent layer and the touch sensitive screen by attaching only the outer peripheral portion of the base transparent layer to the touch sensitive screen. The air gap may be continuous and planar between the base transparent layer and the touch sensitive screen by adhering a protective liner to the underside of the base transparent layer. The protective liner has an outer periphery which is smaller than the outer periphery of the base transparent layer so as to form a step. When the outer peripheral portion of the base transparent layer is adhered to the touch sensitive screen, the base transparent layer is placed into tension by the step thereby lifting the protective liner above and off of the touch sensitive screen. Additionally, the adhesive surrounding the base transparent layer forms an enclosed air gap and traps air between the base transparent layer and the touch sensitive screen. These factors promote formation of the planar air bearing between the base transparent layer and the touch sensitive screen.

The air gap between the base transparent layer and the touch sensitive screen may also be formed by forming a thick adhesive layer at the outer peripheral portion of the base transparent layer. The adhesive is sufficiently thick so that the base transparent layer is lifted off of the touch sensitive screen when the touch screen shield is mounted to the electronic device.

It is also contemplated that in any of the embodiments discussed herein of the shield, one or more sacrificial layers may be mounted on top of the base transparent layer. The sacrificial layers may be removed one at a time from top to bottom as the top most sacrificial layer is damaged. The additional layers provide additional impact protection and retains flexibility so that touch sensitivity of the touch sensitive screen is not compromised.

It is also contemplated that the shield may be formed with an opaque border (e.g., black, pattern, etc.) to hide air bubbles that might form between the outer peripheral portion of the base transparent layer and the touch sensitive screen.

More particularly, a transparent shield for a touch sensitive screen of a device is disclosed. The shield may comprise a first transparent layer, a thin layer of pressure sensitive adhesive and a second transparent layer. The first transparent layer may define opposed first and second sides. The first transparent layer may also define an outer periphery. The thin layer of pressure sensitive adhesive may be disposed on an outer peripheral portion of the second side of the first transparent layer. The second transparent layer may define opposed first and second sides. The first side of the second transparent layer may be attached to a central portion of the second side of the first transparent layer. An outer periphery of the second transparent layer may be smaller than the outer periphery of the first transparent layer so as to define a step.

The outer peripheral portion of the first transparent layer may be attached to the device so that the central portion of the second side of the first transparent layer is positioned on top of the touch sensitive screen of the device. The first transparent layer may be placed in tension when the outer peripheral portion of the first transparent layer is attached to the device.

The shield may further comprise adhesive disposed between the central portion of the second side of the first transparent layer and the second transparent layer for attaching the first and second transparent layer to each other. The adhesive disposed on the outer peripheral portion of the second side of the first transparent layer may be protected by a removable liner. The adhesive may form an enclosed air gap between the shield and touch sensitive screen. The enclosed air gap may form a planar air bearing.

The shield may further comprise one or more transparent sacrificial layers peelably removable from each other and the first side of the first transparent layer so that a top most sacrificial layer may be removed as desired. The first and second transparent layers may be thicker compared to the one or more sacrificial layers. The sacrificial layers may have staggered tabs for assisting in the peeling of the top most sacrificial layer. A peel value between the sacrificial layers may be progressively stronger as the top most sacrificial layer is peeled away.

The adhesive and the first and second transparent layers may have a difference in index of refraction less than 0.2.

The shield may further comprise an opaque annular film at an outer peripheral portion of the first transparent layer.

Moreover, a transparent shield for a touch sensitive screen of a device is disclosed. The shield may comprise a first transparent layer and a pressure sensitive adhesive. The first transparent layer may define opposed first and second sides. The pressure sensitive adhesive may be disposed only at an outer peripheral portion of the second side of the first transparent layer. The pressure sensitive adhesive may be sufficiently thick so as to form an air gap between the first transparent layer and the touch sensitive screen when the shield is mounted to the electronic device. The air gap may be a planar air bearing.

The outer peripheral portion of the first transparent layer may be attached to the device so that the central portion of the second side of the first transparent layer is positioned on top of the touch sensitive screen of the device.

The shield may further comprise one or more transparent sacrificial layers peelably removable from each other and the first side of the first transparent layer so that a top most sacrificial layer may be removed as desired.

The shield may further comprise an opaque annular film at an outer peripheral portion of the first transparent layer.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is an exploded top view of an electronic device with a shield mountable thereon;

FIG. 2 is a cross sectional view of the shield shown in FIG. 1;

DETAILED DESCRIPTION

Figure 3:
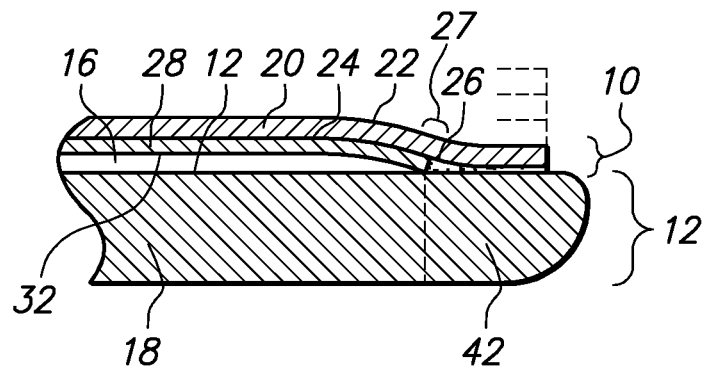
FIG. 3 is a cross sectional view of the shield mounted to the electronic device shown in FIG. 1.

Referring now to the drawings, a shield 10 for a touch sensitive screen 12 is shown. The shield 10 protects the touch sensitive screen 12 from scratches, impacts, etc. The shield 10 is damaged instead of the touch sensitive screen 12. When the shield 10 is scratched, dented, etc. to a degree that makes viewing the touch sensitive screen 12 unacceptable for the user, the shield 10 may be replaced with a new shield 10. Optionally, the shield 10 may have one or more sacrificial layers 14 which may be individually peeled off from each other starting from the top most layer going down to the base shield 10 as the top most sacrificial layer 14 is damaged. The sacrificial layers 14a-h may be mounted on top of the shield 10, 10a. When the shield 10 is attached to the touch sensitive screen 12, an air gap 16 (see FIG. 3) may be formed between the shield 10 and an active area 18 of the touch sensitive screen 12. The air gap 16 eliminates unwanted optical artifacts such as trapped area bubbles, Newton rings and chromatic interference while maintaining the sensitivity of the touch sensitive screen 12.

The air gap 16 may be formed by providing a base transparent layer 20 which defines an exposed side 22 and an interior side 24 (see FIG. 3). The interior side 24 may be coated with a pressure sensitive adhesive 26 (e.g., acrylic adhesive). The pressure sensitive adhesive 26 may cover the entire interior side 24 of the base transparent layer 20. A protective liner 28 may cover the pressure sensitive adhesive 26 coated on the interior side 24 and be attached to the protective liner 28. When the shield 10 is ready to be mounted to the touch sensitive screen 12, an outer peripheral portion 30 (see FIG. 2) or annulus of the protective liner 28 may be removed from the base transparent layer 20 to expose the adhesive 26 only at the outer peripheral portion of the base transparent layer 20 on the interior side 24. A step 27 (see FIGS. 2 and 3) is formed at the outer peripheral edge of the protective liner 28. The shield 10 may be attached to the touch sensitive screen 12 as shown in FIG. 3. More particularly, the entire outer periphery of the base transparent layer 20 may be adhered to the touch sensitive screen 12 so as to form an enclosed air gap 16 and form a planar air bearing. The base transparent layer 20 is tensioned about the step 27. Since an interior side 32 (see FIG. 3) of the protective liner 28 does not have any adhesive, a continuous air gap 16 may be formed between the protective liner 28 and the exposed side 34 of the touch sensitive screen 12.

Figure 4:
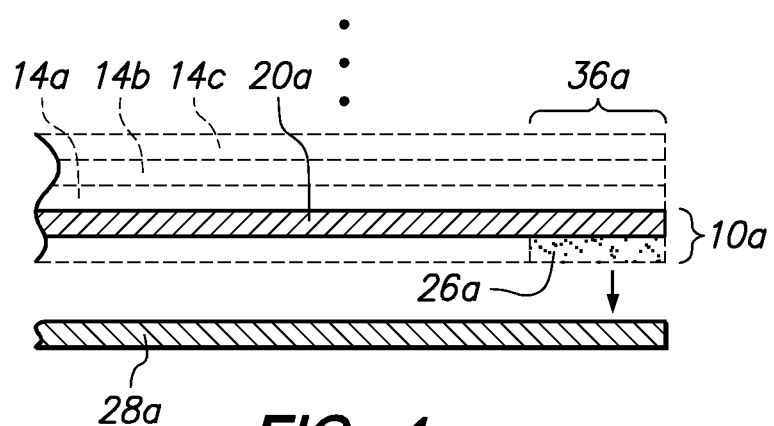
FIG. 4 is a cross sectional view of a second embodiment of the shield shown in FIG. 1.
Figure 5:
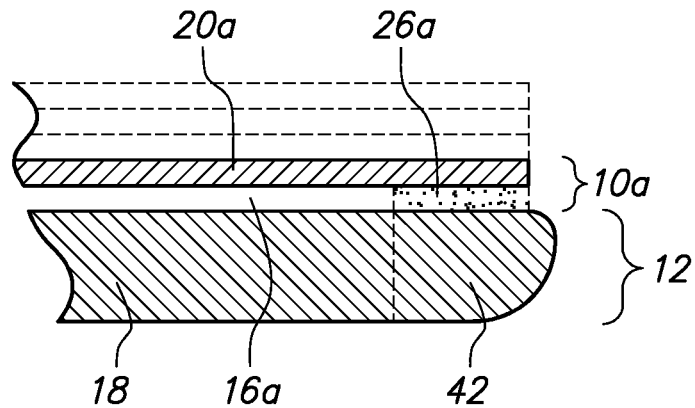
FIG. 5 is a cross sectional view of the second embodiment of the shield and the electronic device shown in FIG. 1.

Alternatively, a base transparent layer 20a may be provided with an adhesive 26a only on the outer peripheral portion 36 of the base transparent layer 20a, as shown in FIG. 4. The shield 10 may be attached to the touch sensitive screen 12 by way of the adhesive 26a, as shown in FIG. 5. The adhesive 26a may be sufficiently thick such that upon adhesion of the base transparent layer 20a to the touch sensitive screen 12, air gap 16a is formed, as shown in FIG. 5.

Moreover, it is contemplated that an opaque film 52 (see FIGS. 6-8) may be disposed at the outer peripheral portion 36 of the base transparent layer 20 to hide any air bubbles 60 that might form between the outer peripheral portion 36 of the base transparent layer 20 and the touch sensitive screen 12.

More particularly, referring now back to FIG. 1, an electronic device 38 such as an IPHONE (i.e., smartphone) is shown. It is also contemplated that the electronic device 38 may be any type of visual display for photographs, video, etc. The electronic device 38 may have a touch sensitive screen 12 which allows a user to operate the electronic device 38. The touch sensitive screen 12 may define an active area 18. In the active area 18, the user may depress various electronic buttons, keys, etc. electronically displayed on the active area 18 to operate the electronic device 38 so as to play video, navigate, start applications, etc. The active area 18 may be disposed adjacent or enclosed within an inactive area 42.

The active area 18 of the touch sensitive screen 12 may be protected by disposing the shield 10 over the touch sensitive screen 12. To this end, the shield 10 may be adhered to the touch sensitive screen 12 wherein only the outer peripheral portion of the shield 10 is adhered to the touch sensitive screen 12. A continuous air gap 16 may exist between the central portion 44 of the shield 10 and the touch sensitive screen 12. Preferably, the adhesive 26 used to adhere the outer peripheral portion of the shield 10 to the touch sensitive screen 12 contacts only the inactive area 42. However, it is also contemplated that the adhesive 26 may adhere the shield 10 also to an outer peripheral portion of the active area 18.

Referring now to FIGS. 2 and 3, the shield 10 may comprise the base transparent layer 20. The base transparent layer 20 may be fabricated from a transparent material (e.g., biaxially-oriented polyethylene terephalate material (boPET), etc.). The base transparent layer 20 may be approximately 4 mil thick (i.e., 0.004"). Adhesive 26 may be coated on a majority, if not the entire, interior side 24 of the base transparent layer 20. To protect the adhesive 26 from dirt and grime prior to installation on the touch sensitive screen, the protective liner 28 may cover the entire interior side 24 of the base transparent layer 20. The adhesive 26 attaches the protective liner 28 to the base transparent layer 20. A cut or slit 46 may be made through the protective liner 28 so as to define an outer peripheral portion 30 or annulus of the protective liner 28 and a central portion 48 of the protective liner 28. The cut or slit 46 may be made with a rotary die, steel rule die, lasers or other methods known in the art.

When the user is ready to attach the shield 10 to the touch sensitive screen 12 of the electronic device 38, the user removes the outer peripheral portion 30 of the protective liner 28 from the shield 10 as shown in FIG. 2. For example, the user may apply a small piece of tape to the outer peripheral portion 30 and peel the outer peripheral portion 30 off of the base transparent layer 20. This exposes the adhesive 26 only at the outer peripheral portion 36 of the base transparent layer 20. This also creates the step 27 between the protective layer 28 still remaining on the base transparent layer 20 and the base transparent layer 20. The user aligns the shield 10 to the touch sensitive screen 12 and applies pressure to the outer peripheral portion 36 of the base transparent layer 20 so that the adhesive 26 adheres the base transparent layer 20 to the touch sensitive screen 12. Preferably, the adhesive 26 is disposed only on the inactive area 42 of the touch sensitive screen 12. The adhesive 26 traps air between the base transparent layer 20 and the touch sensitive screen 12 to form the enclosed air gap 16. Also, the air gap 16 (see FIG. 3) may define a planar air bearing due to tension applied to the base transparent layer 20 about the step 27. The enclosed air gap 16 and the tension lifts the shield 10 off of active area 18 to form a planar air bearing to mitigate unwanted optical artifacts such as trapped air bubbles, Newton rings, and chromatic interference while maintaining the sensitivity of the touch screen. It is also contemplated that the adhesive 26 may be disposed on a portion of the active area 18 at the outer peripheral portion of the active area 18. In this manner, a majority of the active area 18 has an air gap 16 between the touch sensitive screen 12 and the shield 10.

Optionally, the shield 10 may have one or more sacrificial layers 14a-n. The sacrificial layers 14 may be adhered to each other by way of a peelable adhesive disposed between each of the sacrificial layers 14 as well as a bottommost sacrificial layer 14a and the exposed side 22 of the base transparent layer 20. During use of the electronic device 38, the topmost sacrificial layer 14c may become dented, scratched, etc. or otherwise damaged such that viewing through the shield 10 may be unacceptable. At this point, the topmost sacrificial layer 14c may be removed (e.g., peeled) from the shield 10. This uncovers a fresh, clean sacrificial layer 14b. The other sacrificial layers 14b and 14a may be removed top-down as the topmost sacrificial layer 14 becomes damaged. There may be one or more sacrificial layers 14a-n or stack of sacrificial layers 14a-n adhered to the base transparent layer 20. Preferably, there are between two (2) to ten (10) sacrificial layers 14a-n. The sacrificial layers 14a-n may be fabricated from a transparent material such as biaxially-oriented polyethelene terephalate (boPET).

Referring now to a second embodiment shown in FIGS. 4 and 5, a shield 10a may comprise base transparent layer 20a. A thick coat of adhesive 26a may be applied only to the underside of the outer peripheral portion 36a of the base transparent layer 20a. Protective liner 28a may be placed over the thick adhesive coating 26a to protect the adhesive 26a from dirt and grime up until prior to installation of the shield 10a to the touch sensitive screen 12. After removing the protective liner 28a from the shield 10a, the shield 10a is aligned to the touch sensitive screen 12. In particular, the adhesive 26a is preferably aligned to the inactive area 42 of the touch sensitive screen. Air gap 16a is formed between the base transparent layer 20a and the touch sensitive screen 12. The thick adhesive 26a lifts the base transparent layer 20a off of the active area 40 to form the planar air bearing, as shown in FIG. 5.

Optionally, one or more sacrificial layers 14a-n as discussed above in relation to FIGS. 2 and 3 may be mounted to the shield 10a. The sacrificial layers 14a-n may be removed one by one as the topmost sacrificial layer is damaged (e.g., dented, scratched, etc.).

Figure 6:
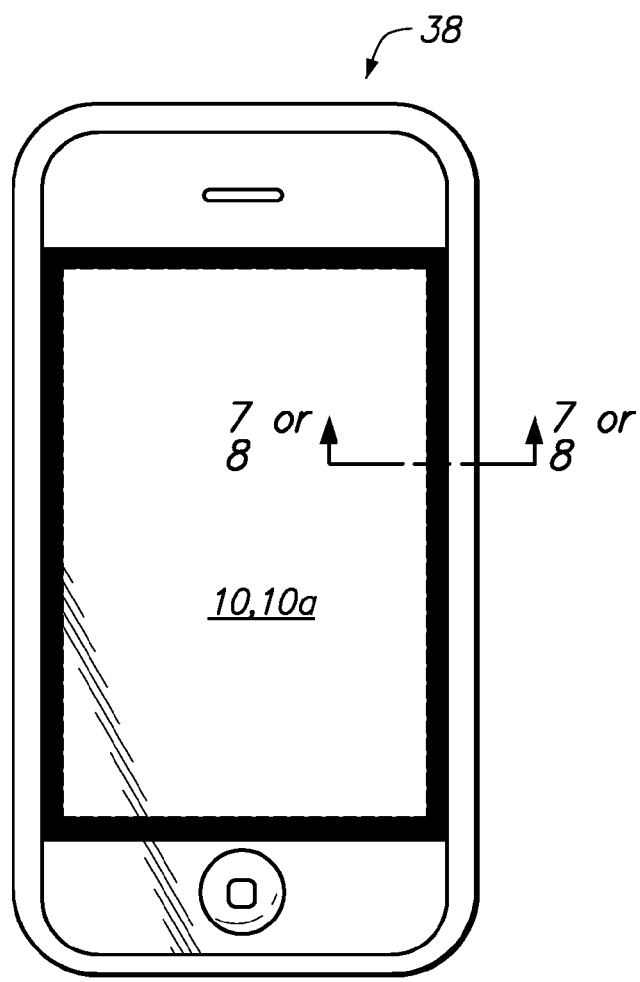
FIG. 6 is a top view of the electronic device shown in FIG. 1 with a shield having an opaque border for hiding air bubbles.
Figure 7:
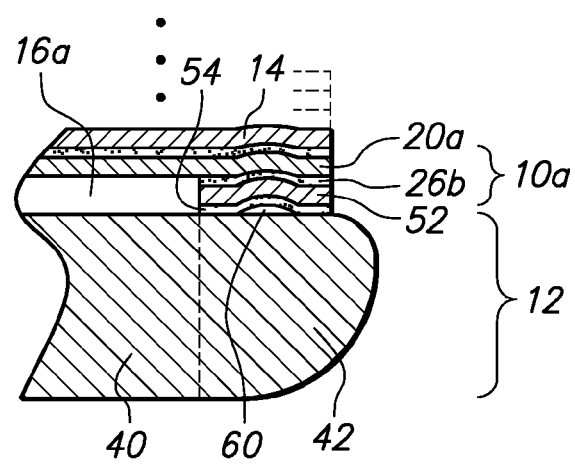
FIG. 7 is a cross sectional view of a first embodiment of a shield with an opaque border attached to the electronic device shown in FIG. 6.
Figure 8:
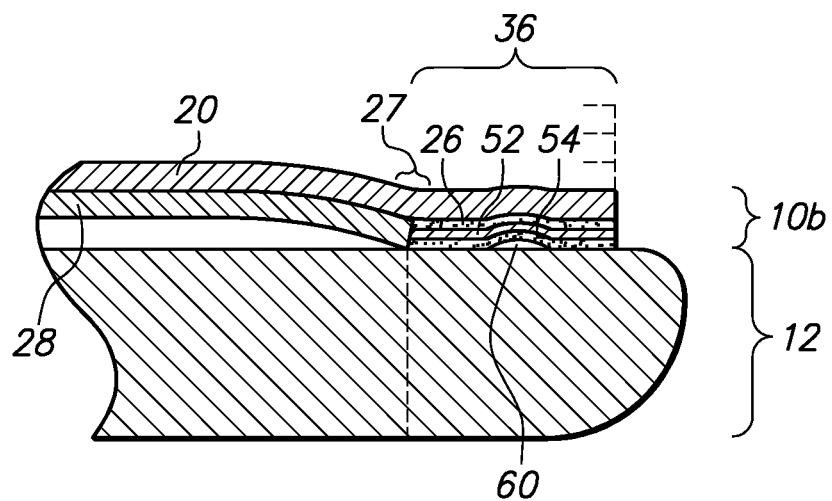
FIG. 8 is a cross sectional view of a second embodiment of a shield with an opaque border attached to the electronic device shown in FIG. 6.

Referring now to FIGS. 6-8, an opaque annular film 52 may be interposed between the outer peripheral portion 36 of the base transparent layer 20, 20a and the touch sensitive screen 12. The opaque annular film 52 may be incorporated into the shields 10, 10a discussed in relation to FIGS. 2-5. The opaque annular film 52 may be black, dark color, patterned, etc. so long as the pattern or color hides or mitigates visibility of air bubbles 60. The opaque transparent layer 52 hides any air bubbles 60 that may exist when attaching the shield 10, 10a to the touch sensitive screen 12. FIG. 6 illustrates a black border. However, upon further inspection of the border area in FIGS. 7 and 8, an air bubble 60 exists between the shield 10, 10a and the touch sensitive screen 12. Nonetheless, due to the opaque annular film 52, such air bubble 60 is not noticeable or is not as noticeable when viewing the touch sensitive screen 12.

More particularly, referring now to FIG. 7, the shield 10a may have an adhesive 26b disposed about the outer peripheral portion 36 of the base transparent layer 20b. The opaque annular film 52 may be attached to the base transparent layer 20b by way of the adhesive 26b. Adhesive 54 may now be coated, sprayed or disposed onto the bottom surface of the opaque annular film 52 for attachment of the shield 10a to the touch sensitive screen 12. The adhesive 26b may be thin so as to not appreciably add to the thickness of the base transparent layer 20. Alternatively, the adhesive 26b or 54 may be thick such as in the embodiment disclosed in FIGS. 4-5. Nonetheless, the film 52 and/or the adhesive 26b, 54 may independently or collectively be sufficiently thick so that the air gap 16a may be formed between the shield 10a and the touch sensitive screen 12.

Sacrificial layers 14a-n may be stacked on top of the base transparent layer 20a as discussed above in relation to FIGS. 2-5.

Referring now to FIG. 8, the shield 10 may also have an opaque annular film 52. The opaque annular film 52 may be disposed at the outer peripheral portion 36 of the base transparent layer 20. Preferably, the opaque annular film 52 and the adhesive 26, 54 is thinner than the protective liner 28, and more particularly, is thinner than the central portion 48 of the protective liner 28. The step 27 is formed at the outer peripheral edge of the protective liner 28. The opaque annular film 52 shown in FIG. 8 is attached to the base transparent layer 20 by way of adhesive 26. Adhesive 54 may be applied to the underside of the opaque annular film 52 to attach the shield 10 to the touch sensitive screen 12. Sacrificial layers 14a-n may also be stacked on top of the base transparent layer 20 as discussed above in relation to FIGS. 2-5.

An index of refraction of the adhesive and the transparent material which forms the sacrificial layers 14a-n, base transparent layer 20 and the protective liner 28 may have a refraction mismatch of 0.2 to minimize unwanted internal reflection, haze, maximize transmissions and contrast of the screen and to maintain the high brightness and contrast of the visual objects displayed on the touch sensitive screen 12. It is also contemplated that the upper surface of each of the sacrificial layers 14 and the exposed side 22 of the base transparent layer 20 may have a thin hard coating. The adhesive that attaches each of the sacrificial layers 14 together as well as the stack of sacrificial layers 14 to the base transparent layer 20 may be provided so that the peel strength is the same throughout the stack. Alternatively, the bottom most layer 14, 20 may have a higher peel value than the layers 14 above the bottom most layer 14, 20. In this manner, as the topmost sacrificial layer 14 is peeled from the lower sacrificial layers 14, the act of peeling the topmost sacrificial layer 14 does not also peel the lower sacrificial layers 14. The peel strength may range between about 25 to about 300 grams/inch. The adhesive discussed herein may be permanently attached to the layer immediately above the adhesive. Accordingly, when the topmost sacrificial layer 14 is peeled, no residue of the adhesive is left on the layer below. The exposed or top side of the fresh sacrificial layer 14 mostly, if not entirely is free from adhesive. Additionally, when all of the sacrificial layers 14 are removed from the shield 10, no adhesive residue is left on the exposed side 22 of the base transparent layer 20.

Each of the sacrificial layers 14, base transparent layer 20 and the protective layer 28 may have a thickness between about 1 mil to about 7 mil with each mil being 0.001" thick. Unless otherwise stated, the adhesive layer attaching the sacrificial layers 14 to each other as well as the sacrificial layers 14 to the base transparent layer 20 may add negligible thickness to the shield 10, 10a. By way of example and not limitation, if each of the sacrificial layers 14, the base transparent layer 20 and the protective layer 28 have a thickness of 2 mil, then the total thickness of the shield 10 may be 8 mil thick provided that there are only two sacrificial layers 14 and one base transparent layer 20 and one protective liner 28.

Figure 9:
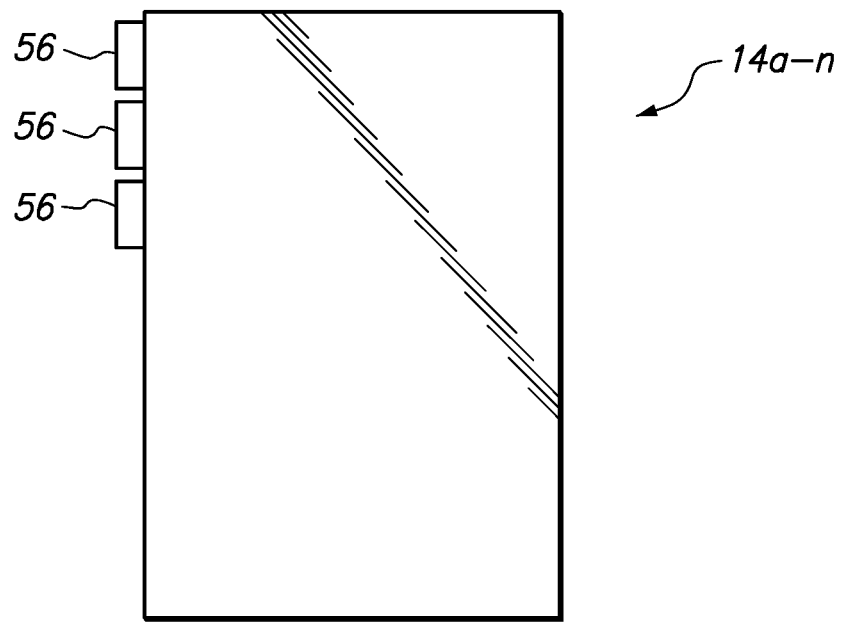
FIG. 9 is a top view of a stack of sacrificial layers with tabs for peeling a topmost layers, the stack being mountable to the shield shown in FIGS. 1-8.

The sacrificial layers 14a-n may be stacked upon each other. Preferably, the sacrificial layers may be generally coextensive with each other so that the stack of sacrificial layers 14a-n appear to be a single film. As discussed above, in order to assist in the peeling of only the top most sacrificial layer 14 while leaving the lower sacrificial layers 14 in place, the adhesive peel strength may be adjusted to be the weakest at the top most sacrificial layer and stronger as the top most sacrificial layer is peel away. Alternatively, or additionally, tabs 56 which are shown in FIG. 9 may be formed as part of the sacrificial layers 14. Each of the sacrificial layers 14a-n may be formed with the tab 56 that extends outward as shown in FIG. 9. No adhesive is formed on the area of the tab 56. Each of the tabs 56 may be offset or staggered with the tabs 56 of the other sacrificial layers so that the user can pull the tab 56 of the then top most sacrificial layer at the time to peel off the top most sacrificial layer 14. Other tabbing systems known in the art may be incorporated such as those shown and described in relation to Japanese Kokai Patent Publication Number 4-314537 and U.S. Pat. No. 6,777,055.

Figure 10:
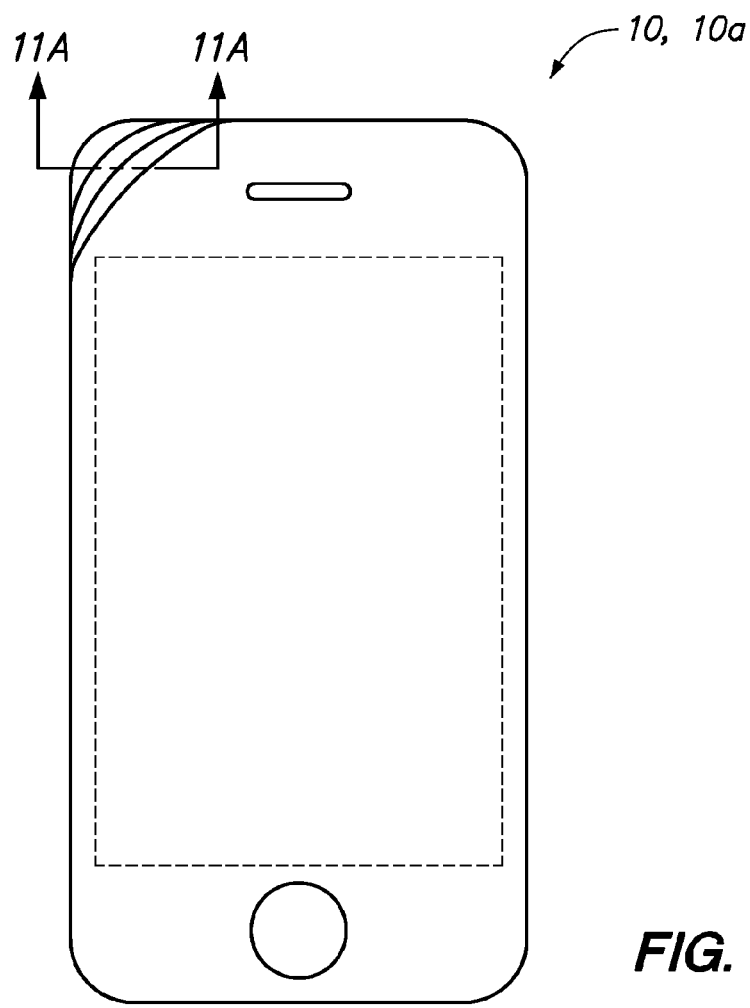
FIG. 10 is a top view of a stack of sacrificial layers with a stair step configuration for peeling a topmost layer, the stack being mountable to the shield shown in FIGS. 1-8.
Figure 11A:
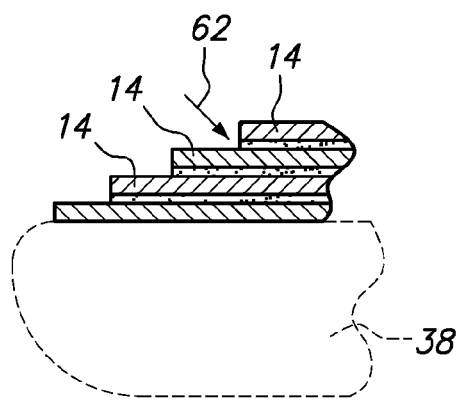
FIG. 11A is a cross sectional view of the stair step shown in FIG. 10.
Figure 11B:
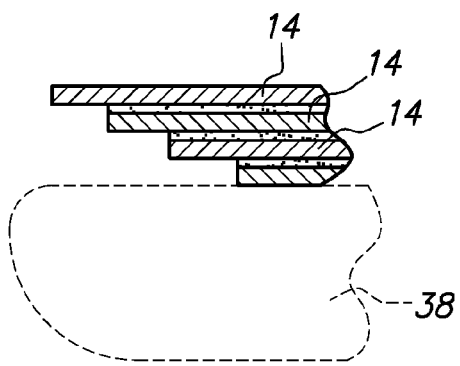
FIG. 11B is an alternative arrangement to the stair step shown in FIG. 11A.

Additionally or alternatively, a peel assist system shown in FIGS. 10-11B may be incorporated into the shield 10, 10a. By way of example and not limitation, a corner of the shield 10, 10a may have a stair step configuration. Although the upper left corner of the shield 10, 10a is shown as having the stair step configuration, any of the other corners, upper right, lower left and/or right corners may have the stair step configuration. A first configuration of the stair step is shown in FIG. 11A. Sacrificial layers 14 may be peeled off layer by layer. The top most sacrificial layer 14 may be peeled off with the aid of a sharp blade or fingernail that digs between the first and second top most layers 14 as shown by arrow 62 to initiate peeling of the top most layer 14. FIG. 11B illustrates a second configuration of the stair step configuration. The stair step configuration is reverse compared to the stair step configuration shown in FIG. 11A. The user may lift the top most layer 14 with his or her finger since the top most layer 14 extends over the rest of the stack of layers 14. The shield 10, 10a has been shown generically attached to the electronic device 38 for the purposes of clarification. However, any of the attachment methods discussed herein may be implemented in the shield 10, 10a embodiments shown in FIGS. 10-11B.

Certain embodiments of the shield 10 above were directed to a multi-layer shield 10. Either the base transparent layer 20 was adhered to a lower protective layer 28 and/or one or more sacrificial layers 14a-n. These layers 20, 28, 14a-n are each adhered to each other. The layers 20, 28, 14a-n and the adhesive may absorb impact shock caused when the electronic device 38 is dropped or the touch sensitive screen 12 hits a solid object. The impact is reduced at each adhesive interface where the softer adhesive may yield and spread out the impact force laterally instead of proceeding directly into the glass of the touch sensitive screen. Additionally, the stacked construction of the shield 10 and the sacrificial layers 14a-n retain the flexibility or bendability of the layers to maintain the tactile response for the touch sensitive screen.

Preferably, the base transparent layer 20, protective layer 28, and sacrificial layers 14 are fabricated from biaxially oriented polyethelene terephalate material (boPET).

Referring back to FIG. 1, the various embodiments of the shield and sacrificial layers disclosed herein may be enlarged to cover the front surface of the electronic device 38. An example of the enlarged shield is shown in FIG. 1 in hidden lines. Cutouts 58 may be made through the shield to allow for physical buttons and speakers on the electronic device 38.

In lieu of the opaque annular film 52, it is also contemplated that the base transparent layer 20, 20a may have an opaque printed border which serves the same function as the opaque annular film 52. The opaque border on the base transparent layer 20, 20a may be formed by a screen printing, etc. or other methods known in the art. It is also contemplated that the adhesive 26, 26a, 26b, 54 may be colored so as to be opaque and hide the air bubbles 60.

The above description is given by way of example, and not limitation. Given the above disclosure, one skilled in the art could devise variations that are within the scope and spirit of the invention disclosed herein, including various ways of forming the slit for the annular ring. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for protecting a touch screen of a hand held electronic device having a front face that includes a touch screen portion and a non-functional outer perimeter, which method comprises:

providing a touch screen protector comprising a film having front and back sides, an outer perimeter that essentially corresponds to the outer perimeter of the touch screen of the front face of the device, and a transparent window that essentially corresponds in size to that of the touch screen portion; a spacer provided on the back side of the film along the outer perimeter thereof and continuously surrounding the transparent window so as to trap air between the film and the touch screen portion, with the spacer having a thickness sufficient to space the film near but not in contact with the touch screen; an exposed adhesive on one side of the spacer that faces the touch screen, with the exposed adhesive having sufficient adhesiveness to mount the touch screen protector onto the touch screen and to enable its removal; and a joining adhesive for adhering the spacer to the bark side of the film, wherein the joining adhesive has an adhesive strength that is stronger than that of the exposed adhesive so that the spacer is not removed from the film when the protector is removed from the front face of the device;

removably attaching the touch screen protector upon the touch screen of the device via the exposed adhesive to form a space between the transparent window of the film, the spacer and the touch screen portion of the device, wherein the touch screen protector is attached without causing bubble formation between the transparent window of the film and the touch screen portion of the device;

wherein the transparent window can be pressed against the touch screen portion of the device for operation of the device while preventing direct contact of a user's fingers with touch screen portion of the device and without producing visible interference patterns during use.

2. The method of claim 1, wherein the film has a thickness of between about 0.001 inch to about 0.007 inch and includes an opaque band about its periphery that receives the spacer.

3. The method of claim 1, wherein the front face of the device has a non-functional band about its perimeter and the width of the spacer is selected to conform to or be within the band so that the spacer does not interfere with the use of the touch screen portion when the touch screen protector is adhesively mounted onto the device.

4. The method of claim 1, which further comprises providing a backing member to protect the back side of the film and the exposed adhesive prior to use.

5. The method of claim 1, which further comprises providing one or more alignment holes that match one or more buttons on the electronic device to facilitate mounting of the touch screen protector on the device.

6. The method of claim 1, wherein the touch screen of the device and the film are each substantially rectangular and the touch screen is part of a telephone, reading device, music device, viewing device or navigation device.

7. The method of claim 1, wherein the space formed between the transparent window of the film, the spacer and the touch screen portion of the device is an enclosed spare.

8. The method of claim 1 wherein the film is a plastic film.

9. The method of claim 8 wherein the plastic film has a thickness of between about 0.001 inch and about 0.007 inch.

10. A method of protecting a touch screen of a hand held electronic device having a front face that includes a touch screen having a touch screen portion and a non-functional outer perimeter, which method comprises:

providing a touch screen protector comprising a film having from and back sides, an outer perimeter that essentially corresponds to the outer perimeter of the outer perimeter of the touch screen of the front face of the device, and a transparent window that essentially corresponds in size to that of the touch screen portion; and a spacer adhered to the back side of the film upon at least a portion of the outer perimeter of the film continuously surrounding the transparent window so as to trap air between the film and the touch screen portion, the spacer having a thickness sufficient to space the near but not in contact with the touch screen portion with an exposed adhesive on one side of the spacer that faces the touch screen to mount the touch screen protector onto the touch screen and to enable its removal, and a joining adhesive on the other side of the spacer for adhering the spacer to the back side of the film, with the joining adhesive having an adhesive strength that is stronger than that of the exposed adhesive so that the spacer is not removed from the film when the protector is removed from the touch screen of the front face of the device; and removably attaching the touch screen protector upon the outer perimeter of the front face of the device via the exposed adhesive to form a space between the transparent window of the film, the spacer and the touch screen portion of the device, wherein the touch screen protector is attached without causing bubble formation between the transparent window of the film and the touch screen portion of the device;

wherein the transparent window can be pressed against the touch screen portion of the device for operation of the device while preventing direct contact of a user's fingers with the touch screen portion of the device and without producing visible interference patterns between the transparent window of the film and the touch screen portion of the device during use.

11. The method of claim 10, wherein the film is a plastic film, the touch screen of the device and the film are each substantially rectangular, and the spacer is provided at least upon the top and bottom portions of the outer perimeter of the film.

12. A method for protecting a touch sensitive screen of an electronic device with a flexible shield, the touch sensitive screen having an active area, the flexible shield having a base layer and a protective liner, the method comprising:

removing an outer peripheral portion of the protective liner from the flexible shield to expose an adhesive on an outer periphery of the base layer and to create a step between a remaining portion of the protective liner and the base layer; and attaching the flexible shield to the touch sensitive screen by applying pressure to the outer peripheral portion of the base layer so that the exposed adhesive on outer peripheral portion of the base layer adheres the flexible shield to the touch sensitive screen, and so that the step applies tension to the base layer, wherein the attaching step traps air between the base layer and the active area of the touch sensitive screen, and wherein the tension is sufficient to lift the flexible shield off of the active area of the touch sensitive screen.

13. A method for protecting a touch sensitive screen of an electronic device with a flexible shield, the touch sensitive screen an active area and an inactive area, the flexible shield having an adhesive applied about an outer periphery of the flexible shield, the method comprising:

aligning the flexible shield so that a portion of the outer periphery of the flexible shield is positioned over a portion of the inactive area of the touch sensitive screen; and attaching the flexible shield to the operating surface so that the adhesive on the outer periphery adheres the flexible shield to the touch sensitive screen, wherein the adhesive has a thickness sufficient to lift the flexible shield off the active area of the touch sensitive screen, and wherein the adhesive traps air between the flexible shield and the active area of the touch sensitive screen.

14. A method for protecting a touch sensitive screen of an electronic device with a flexible shield, the touch sensitive screen having an active area and an inactive area, the flexible shield having a base layer and an annular film applied to an underside surface of the base layer and about an outer periphery of the base layer, the annular film having, an exposed adhesive applied on an exposed surface of the annular film, the method comprising:

aligning the flexible shield so that at least a portion of the annular film is positioned over the inactive area of the touch sensitive screen; and attaching the flexible shield to the operating surface so that the exposed adhesive on the annular film adheres the flexible shield to the touch sensitive screen, wherein the annular film has a thickness sufficient to lift the base layer off the active area of the touch sensitive screen, and wherein the exposed adhesive on the annular film traps air between the base layer of the flexible shield and the active area of the touch sensitive screen.

* * * * *

UNITED STATES PATENT AND TRADEMARK OFFICE
CERTIFICATE OF CORRECTION

| | | |
|---|---|---|
| PATENT NO. | : 8,974,620 B2 | Page 1 of 2 |
| APPLICATION NO. | : 13/838311 | |
| DATED | : March 10, 2015 | |
| INVENTOR(S) | : Stephen S. Wilson, Bart Wilson and Seth Wilson | |

It is certified that error appears in the above-identified patent and that said Letters Patent is hereby corrected as shown below:

In the specification

Column 1, line (5) the portion reading "filed on May. 14" should read -- "filed on May 14" --

In the claims

Column 9, line (16) the portion reading "spacer to the bark side" should read -- "spacer to the back side" --

Column 9, line (33) the portion reading "with touch screen portion of the device" should read -- "with the touch screen portion of the device" --

Column 9, line (57) the portion reading "is an enclosed spare" should read -- "is an enclosed space" --

Column 9, line (66) the portion reading "from and back sides" should read -- "front and back sides" --

Column 9, line (67) to Column 10, line (1) the portion reading "to the outer perimeter of the outer perimeter of the touch screen" should read -- "to the outer perimeter of the touch screen" --

Column 10, line (8) the portion reading "space the near but not" should read -- "space the film near but not" --

Column 10, line (62) the portion reading "screen an active area" should read -- "screen having an active area" --

Column 11, line (1) the portion reading "to the operating surface" should read -- "to the touch sensitive screen" --

Signed and Sealed this
Twenty-seventh Day of October, 2015

Michelle K. Lee
*Director of the United States Patent and Trademark Office*

CERTIFICATE OF CORRECTION (continued)
U.S. Pat. No. 8,974,620 B2

Column 11, line (14) the portion reading "the annular film having, an" should read -- "the annular film having an" --

Column 11, line (20) the portion reading "to the operating surface" should read -- "to the touch sensitive screen" --